W. J. DEVINE.
CHURN.
APPLICATION FILED MAR. 25, 1911.
1,020,806.
Patented Mar. 19, 1912.
2 SHEETS—SHEET 1.
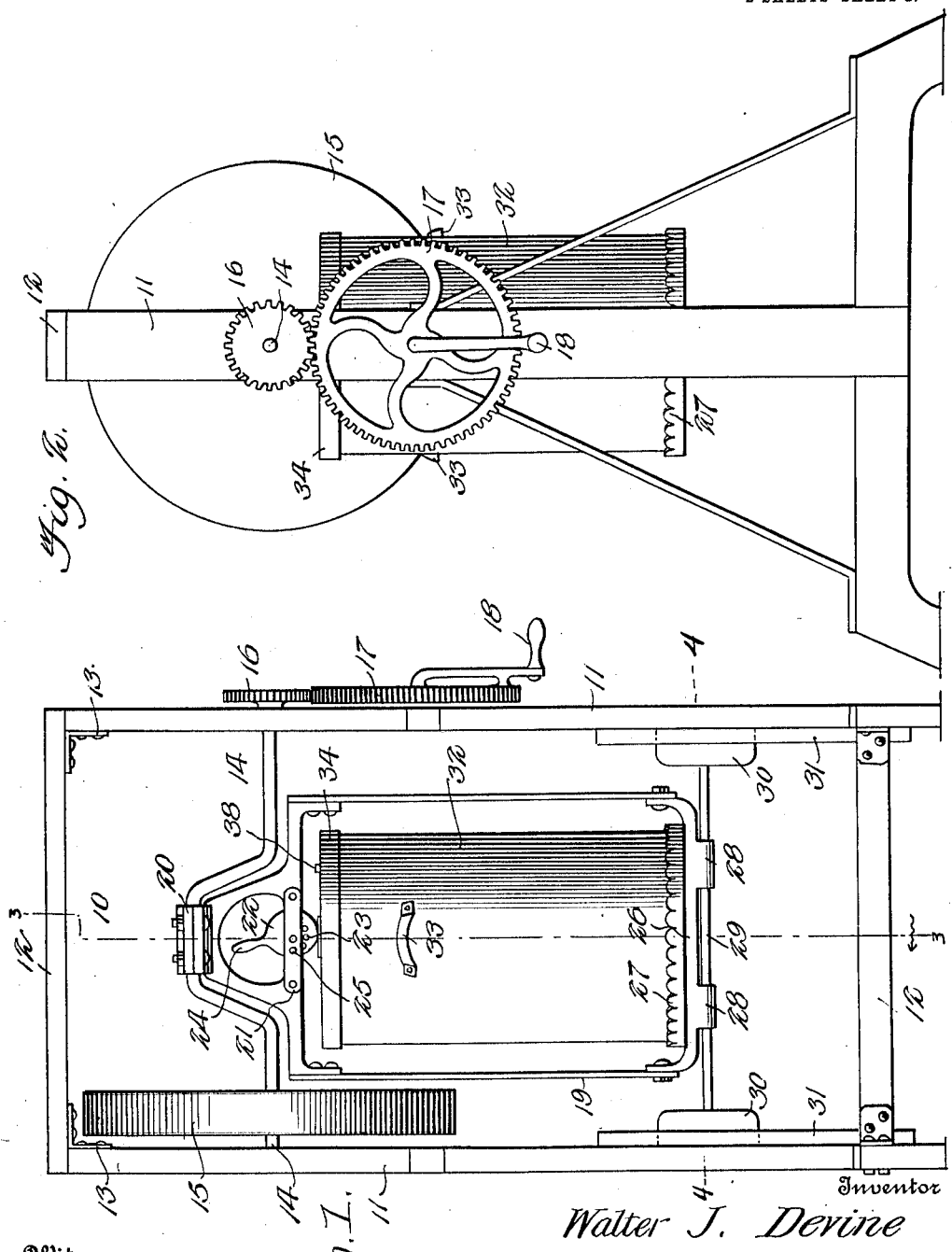
Witnesses
Inventor
Walter J. Devine
By Victor J. Evans
Attorney

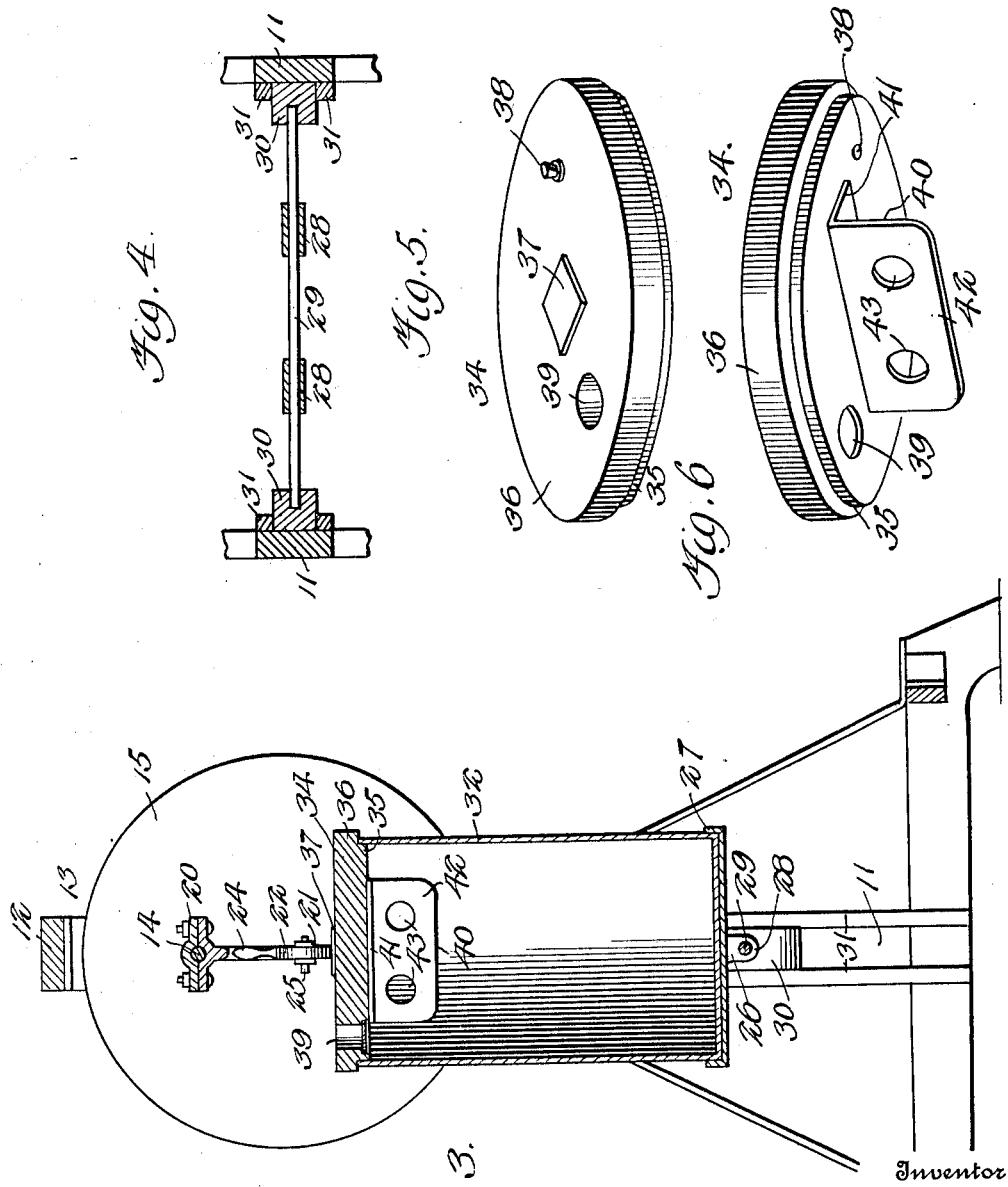

UNITED STATES PATENT OFFICE.

WALTER J. DEVINE, OF MONUMENT, KANSAS.

CHURN.

1,020,806.  Specification of Letters Patent.  Patented Mar. 19, 1912.

Application filed March 25, 1911. Serial No. 616,914.

*To all whom it may concern:*

Be it known that I, WALTER J. DEVINE, a citizen of the United States, residing at Monument, in the county of Logan and State of Kansas, have invented new and useful Improvements in Churns, of which the following is a specification.

The invention relates to churns, particularly churns operable by means of a crank mechanism, and has for an object to provide a device for converting milk or cream into butter.

Among other features, my invention partakes of a frame provided with a crank connected with suitable gearing and a handle for operating the crank, a skeleton can supporting frame connected to the crank and slidable relatively to the churn frame, a can adapted to contain milk or cream and mounted within the said skeleton frame, means mounted on the can frame for releasably securing the cover of the can to the can and holding the same thereon and means on the under side of the can cover and projecting into the can for receiving the deposit of butter when the said handle is operated to actuate the crank mechanism and reciprocate the can mounted in the can frame, a suitable fly wheel being provided for connection with the crank shaft to provide a relatively smooth operation of the same.

Reference is to be had to the accompanying drawings constituting a part of this specification, in which similar characters of reference denote corresponding parts in all the views, and in which—

Figure 1 is a front elevation. Fig. 2 is a side elevation. Fig. 3 is a sectional view taken on the line 3—3 in Fig. 1. Fig. 4 is a transverse sectional view taken on the line 4—4 in Fig. 1. Fig. 5 is a perspective view of the can cover showing the upper side thereof, and Fig. 6 is a perspective view of the can cover showing the under side thereof.

Referring more particularly to the various views I employ a churn frame 10 consisting substantially of uprights 11 having suitable cross bars 12 connected thereto by means of angle bars 13 and mounted on the uprights 11 of the churn frame 10 is a crank shaft 14 having a fly wheel 15 keyed to one end thereof and a gear wheel 16 keyed to the other end thereof, the said gear wheel being adapted to mesh with a gear wheel 17 mounted on one of the uprights 11 and having secured thereto an operating handle 18.

A can frame 19 is provided and has its upper end provided with suitable securing lugs 20 for securing the said can frame to the crank shaft 14. Mounted on the can frame are a plurality of bars 21 having mounted thereon a cam 22 provided with a series of holes 23 and having an integral handle 24, the mentioned bars 21 being provided with apertures 25 adapted to register with the apertures 23 so that a pin inserted through the apertures 25 and one of the apertures 23 will substantially hold the cam 22 in rigid position. The lower end of the can frame 19 is provided with a base 26 having a series of integral laterally extending corrugated flanges 27 and integrally formed in the under side of the can frame 19 are a plurality of integral bearings 28 adapted to receive a rod 29 having its ends secured to slides 30 mounted to operate longitudinally in guides 31 secured to the inner sides of the uprights 11.

A can 32 provided with a handle 33 is adapted to be received in the can frame 19 with the bottom of the can 32 resting on the base 26 of the can frame 19 and the can 32 is provided with a removable cover 34 having an integral depending portion 35 for reception in the upper end of the can 32 and a flanged circular portion 36 adapted to cover the top of the can 32. A bearing plate 37 is secured to the upper side of the cover 34 and constitutes the surface for the cam 22 as will be hereinafter more fully disclosed. A suitable gas vent 38 is provided in the cover 34 and an opening 39 is formed in the cover and adapted to receive therein a gage for suitably gaging the condition of the contents of the can 32. The under side of the depending portion 35 of the cover 34 is provided with a deposit plate 40 consisting of a portion 41 for connection with the depending portion 35 and a laterally extending portion 42 having therein a plurality of apertures 43.

In the operation of my device the can 32 is filled with a desired amount of milk or cream, the cover 34 is placed thereon and the can is then mounted in the can frame 19 as shown in Fig. 1. The cam 22 is then operated to engage the plate 37 of the cover 34 and the can is then secured in rigid position by means of a pin inserted through the apertures 25 and one of the apertures 23 in the cam so that the cam will securely hold the cover 34 in proper position on the can 32. The handle 18 is then turned and as will be readily seen in Figs. 1 and 2, the resultant turning of the handle 18 will actuate the crank shaft 14 to move the can frame 19 and can 32 vertically with respect to the churn frame 10, the said slides 30 being slidable in the guides 31, while the fly wheel 15 keyed to the crank shaft 14 will tend to equalize the turning movement of the crank shaft and provide a smooth operation. As the result of the vertical movement of the can 32, the milk or cream contained therein will gradually turn to butter and the same will be deposited upon the deposit plate 42 secured to the under side of the cover 34. By means of the gage inserted in the opening 39, the amount of butter produced in the can will be known at all times and when a sufficient quantity of butter has been produced the reciprocating movement of the can is stopped, the can is removed from the frame by releasing the cam 22 and the desired article is taken from the can in the usual manner.

Although for the purpose of describing my invention I have shown a particular construction, it will be understood that the scope of the invention is defined in the appended claims and that the precise construction of the churn frame need not be adhered to provided the underlying principle of the invention is not lost.

Having thus fully described the invention, what I claim as new, is:—

1. In a churn the combination of a churn frame, a can frame mounted on the churn frame, a corrugated base on the can frame, a can mounted on the said base, a cover for removable attachment to the said can, a plate secured to the upper side of the said cover and adapted to be engaged by the said can to hold the said can in position on the said can frame and means mounted on the said churn frame for imparting a reciprocating movement to the said can frame.

2. A churn comprising a churn frame, a crank shaft mounted on the said churn frame, a fly wheel keyed to one end of the said crank shaft, a can frame dependingly mounted on the said crank shaft, guides formed on the said churn frame, a plurality of slides extended from the lower end of the said can frame and adapted to slide in the guides of the said churn frame, a corrugated base formed on the said can frame, a can mounted to rest on the said base, a cover for the said can, a plate secured to the said cover and adapted to extend into the said can for receiving the deposit thereof, a cam mounted on the said can frame and engaging the said cover to hold the said can in position on the said can frame and means for connection with the said crank shaft to impart a reciprocating movement to the said can frame.

In testimony whereof I affix my signature in presence of two witnesses.

WALTER J. DEVINE.

Witnesses:
F. M. KESLER,
C. A. THOMAS.

---

Copies of this patent may be obtained for five cents each, by addressing the "Commissioner of Patents, Washington, D. C."